Figure 1:
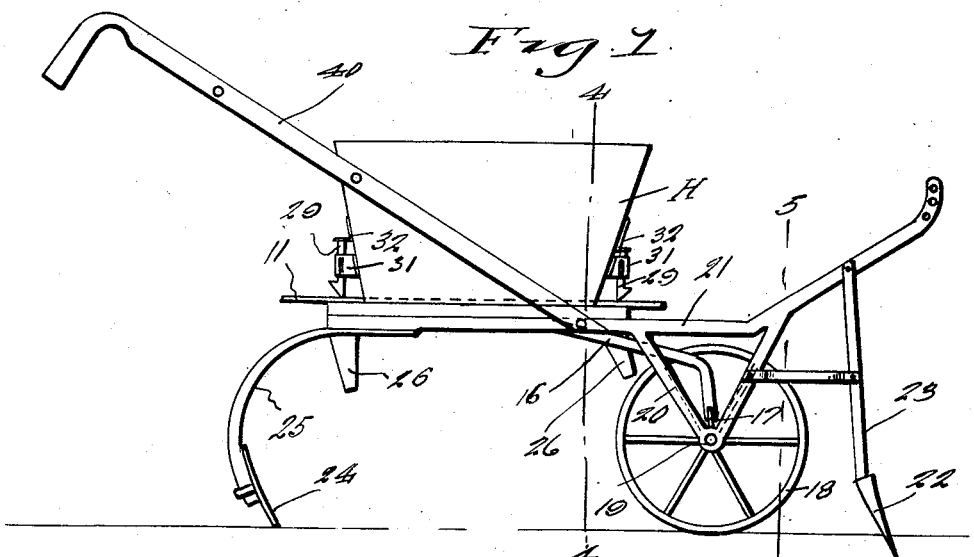

April 12, 1932.   J. D. BRUTON   1,853,759
PLANTER
Filed Aug. 20, 1930   3 Sheets-Sheet 1

Inventor

John H. Bruton

By Clarence A. O'Brien
Attorney

April 12, 1932.  J. D. BRUTON  1,853,759
PLANTER
Filed Aug. 20, 1930   3 Sheets-Sheet 2

Inventor
John D. Bruton

By Clarence A. O'Brien
Attorney

Inventor
John D. Bruton

By Clarence A. O'Brien
Attorney

Patented Apr. 12, 1932

1,853,759

UNITED STATES PATENT OFFICE

JOHN D. BRUTON, OF GOLDSBORO, NORTH CAROLINA

PLANTER

Application filed August 20, 1930. Serial No. 476,584.

The present invention relates to a planter and has for its prime object to provide a structure whereby the seed or the like from the hopper is ejected therefrom in a positive manner.

Another very important object of the invention resides in the provision of a planter structure of this nature mounted so that the operator may see the seeds as they are falling thus knowing the apparatus is properly operating.

A still further very important object of the invention resides in the provision of an apparatus of this nature which is exceedingly simple in its construction, inexpensive to manufacture, thoroughly efficient and reliable in use and operation, compact and convenient in its arrangement of parts, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
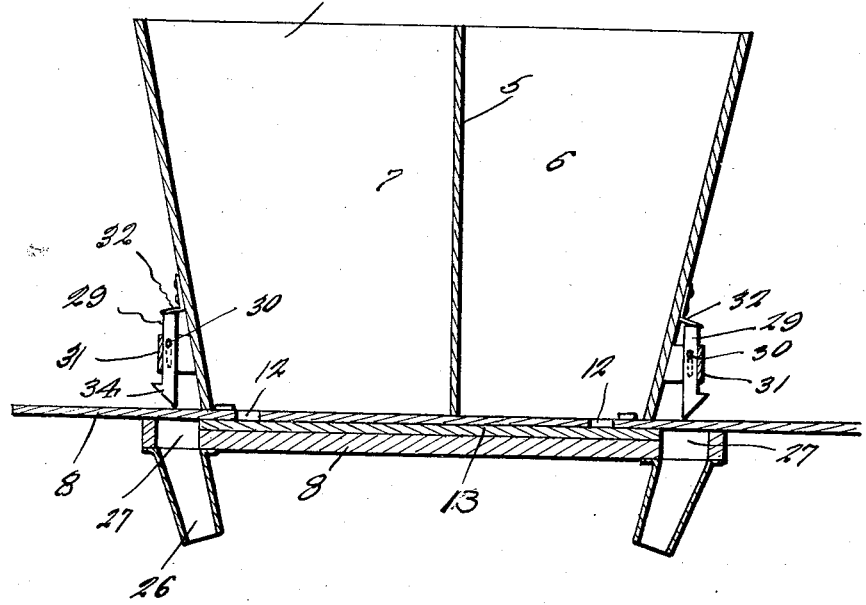
Figure 3:
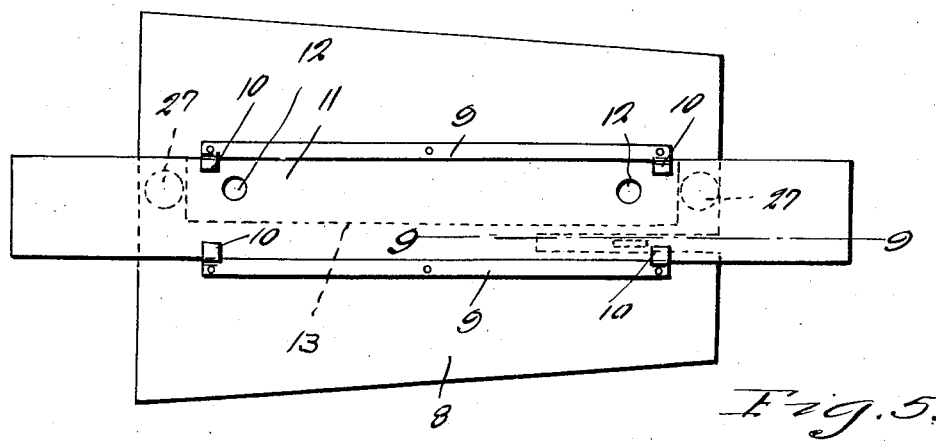
Figures 4, 5:
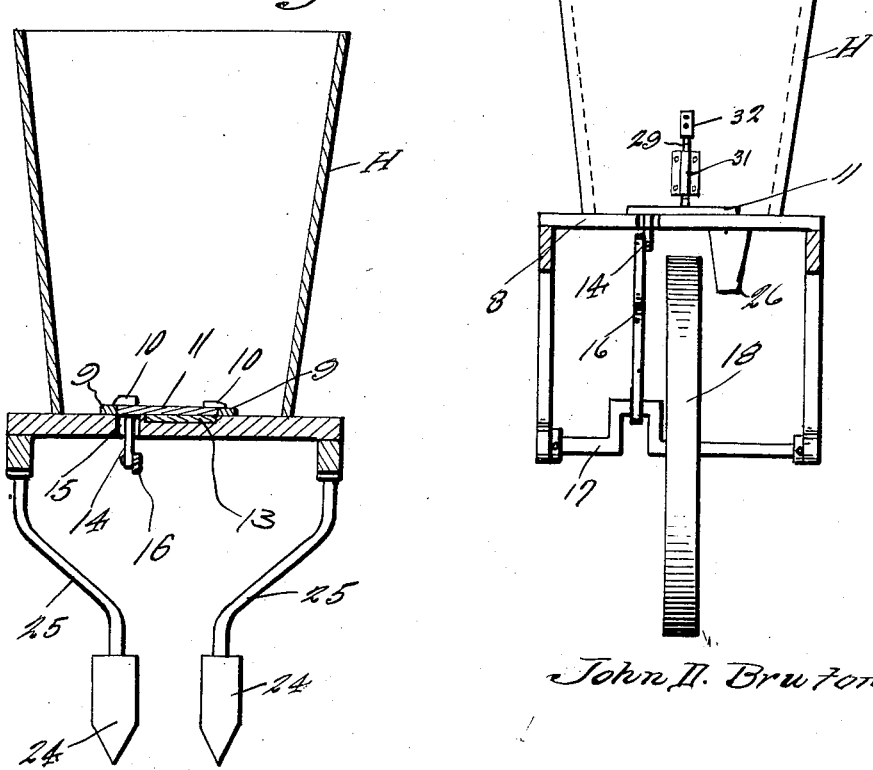
Figure 6:
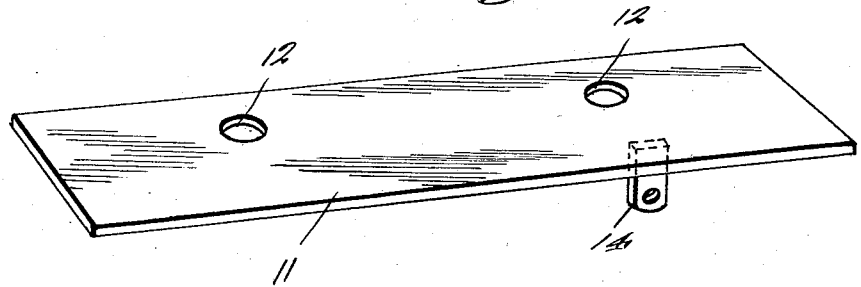
Figure 7:
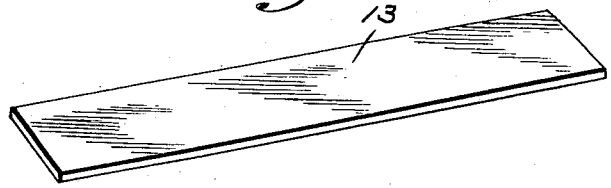
Figure 8:
Figure 9:
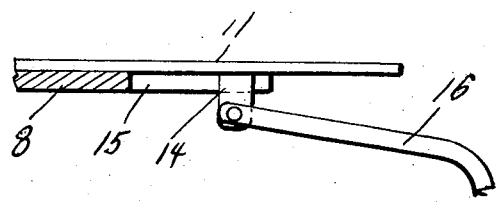

In the drawings:

Figure 1 is a side elevation of an apparatus embodying the features of my invention, Figure 2 is a longitudinal vertical section through the hopper, Figure 3 is a top plan view of the bottom, Figure 4 is a vertical section taken transversely substantially on the line 4—4 of Figure 1, Figure 5 is a transverse section taken substantially on the line 5—5 of Figure 1, Figure 6 is a perspective view of the reciprocating plate, Figure 7 is a perspective view of the bearing plate, Figure 8 is a perspective view of one of the cleats, and Figure 9 is a detail section taken substantially on the line 9—9 of Figure 3.

Referring to the drawings in detail it will be seen that the letter H denotes generally a hopper with the partition 5 transversely disposed to form two compartments 6 and 7. The hopper H rises from a bottom 8 on which is longitudinally arranged a pair of spaced parallel coextensive cleats 9 with fingers 10 overhanging a slide board 11 with a pair of openings 12 therein one for each compartment 6 and 7. A bearing board 13 is disposed under the board 11 being in a recess formed in the top of the bottom as is shown clearly in Figure 4.

A lug 14 depends from the board 11 through a slot 15 in the bottom 8. A link 16 is pivotally engaged with the lug and extends forwardly and is engaged with a crank 17 on axle 19 on the ends of which are wheels 18. The axle 19 is journalled in brackets 20 depending from frame 21. Digging elements 22 depend from the forward portion of the frame by means of shanks 23. Covering elements 24 depend from the rear of the frame by means of curved shanks 25. Boots 26 depend from the bottom 8 in registry with openings 27. Pushers 29 have pin and slot connections 30 with brackets 31 on the front and rear of the hopper H and are spring pressed as at 32 against the board 8 so as to project down through the opening 12 when these openings come into registry with the openings 27 thereby pushing the seed out in a positive manner. The bottoms of these pushers are beveled as at 34 so that the edges of the opening will force the pushers upwardly as the board moves to dispose its openings out of registry with the openings 27 as will be quite apparent from an inspection of the drawings.

Suitable handles 40 are provided and any suitable draft means may be hitched to the front of the frame.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

In a planter structure of the class described, a bottom having an opening therein, a board having an opening, means slidably mounting the board on the bottom, a spring pressed pusher impinging against the board so that when its opening is brought into registry with the opening of the bottom, said pusher extends down into the opening, and said pusher having a beveled end to engage with the edge of the opening in the board so as to be moved out of the opening on the principle of the incline plane, a hopper rising from the bottom over the board, a bearing board embedded in a recess in the bottom under the first mentioned board, a pair of cleats on the bottom, one to each side of the first mentioned board and having fingers overhanging said first mentioned boards, boots depending from the openings in the bottom, a wheeled frame for the bottom, a crank connected with the wheel thereof and a pitman connecting the crank with the sliding board.

In testimony whereof I affix my signature.

JOHN D. BRUTON.